United States Patent [19]

Singh et al.

[11] Patent Number: 5,132,524
[45] Date of Patent: Jul. 21, 1992

[54] MULTI DIRECTIONAL LASER SCANNER

[75] Inventors: Ishwar Singh, Winter Springs; William Senkevich; William C. Daley, both of Longwood, all of Fla.

[73] Assignee: LazerData Corporation, Orlando, Fla.

[21] Appl. No.: 526,455

[22] Filed: May 21, 1990

[51] Int. Cl.$^5$ .............................................. G06K 7/10
[52] U.S. Cl. ............................. 235/467; 359/201; 359/204; 359/214; 359/216
[58] Field of Search .................. 235/467; 350/6.7, 6.8; 359/201, 204, 213, 214, 216

[56] References Cited

U.S. PATENT DOCUMENTS

| | | | |
|---|---|---|---|
| 4,009,369 | 2/1977 | Hayosh et al. | 235/467 |
| 4,652,732 | 3/1987 | Nickl | 235/467 X |
| 4,805,974 | 2/1989 | Brueggemann et al. | 350/6.7 |
| 4,939,355 | 7/1990 | Rando et al. | 235/467 |
| 4,962,980 | 10/1990 | Knowles | 235/467 X |
| 4,999,482 | 3/1991 | Yang | 235/467 X |

*Primary Examiner*—David Trafton
*Attorney, Agent, or Firm*—William M. Hobby, III; Hobby & Beusse

[57] ABSTRACT

An multi directional laser scanner apparatus has a frame along with a plurality of lasers removably mounted in circular fashion to the frame for producing a plurality of light beams. A multi-faceted rotating mirror assembly is rotatably mounted to the frame and rotated by an electric motor and is aligned with a plurality of laser output beams. A plurality of fixed mirrors are attached in pairs to the frame and positioned for reflecting the light energy of the laser beam being reflected by the rotatable mirror assembly in a pattern onto a coded surface and positioned for receiving reflected beams from the coded surface and than directing the reflected beams in a reverse path onto the rotating mirror assembly and back towards each laser. A mirror mounted adjacent the output of each laser reflects each returning laser beam onto a photocell mounted to the frame for receiving the reflected signals from the coded surface and the signals are processed to read the coded signals. An alternate embodiment replaces two of the fixed array mirrors with a galvanometer and mirror assembly which oscillates a mirror affixed to each galvanometer to produce a second set of output scan lines over the primary laser output scan lines onto a bar code to reduce the chance that a small bar code will not be read by the primary scanner.

15 Claims, 5 Drawing Sheets

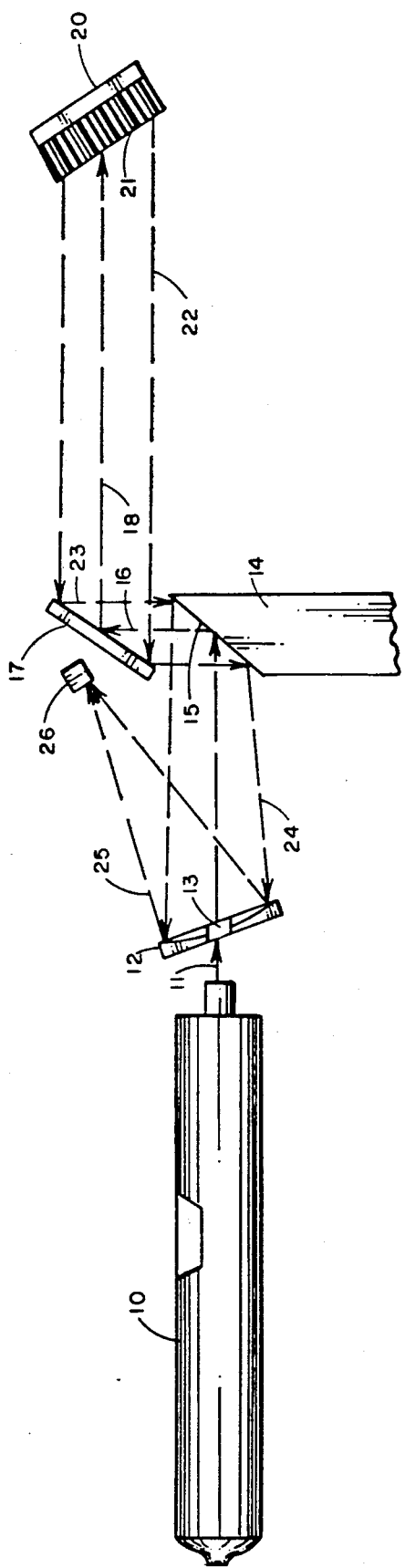
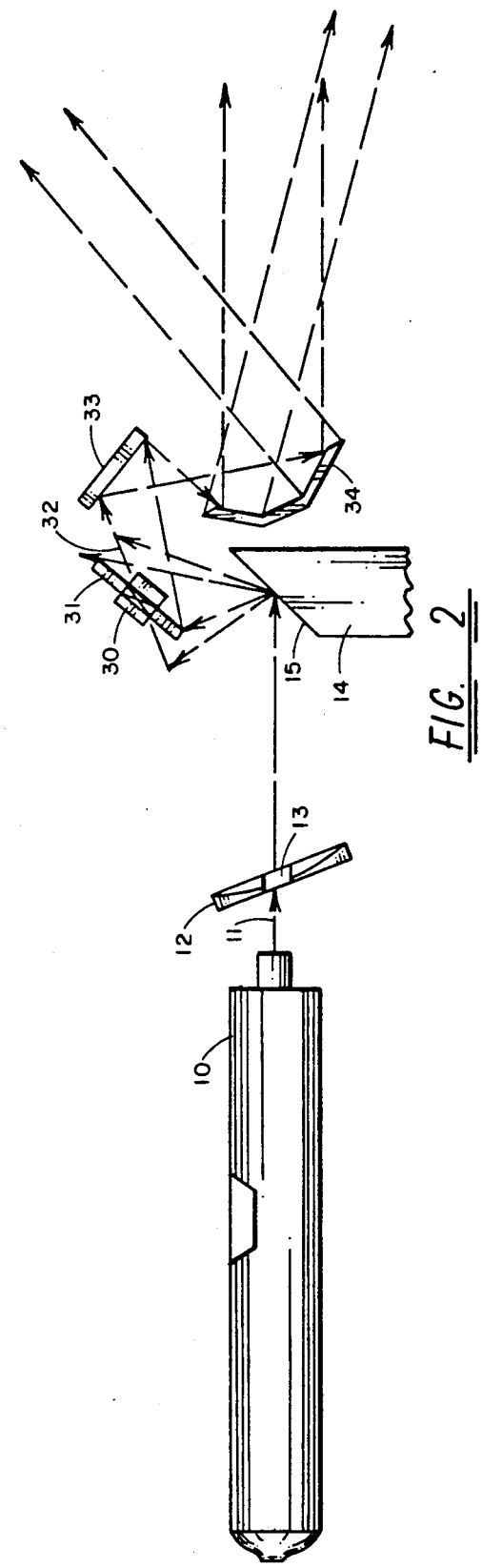
FIG. 1
FIG. 2

MULTI DIRECTIONAL LASER SCANNER

BACKGROUND OF THE INVENTION

The present invention relates to an multi-directional laser scanner and particularly to a scanner having a plurality of lasers and a mirror assembly for producing a compact multi-directional bar code scanner.

Optical scanning systems typically use a mirror scanning assembly for scanning a code symbol consisting of a combination of spaced parallel bars affixed to an object. These code symbols are commonly referred to as "bar code symbols" or "universal product code symbols" and are affixed to many types of packages. A typical scanning system includes a housing with a panel for defining a scanning region adjacent the panel for receiving objects having a bar code symbol and a light source, such as a laser, for providing a light beam, and an optical system for scanning the light beam in a predetermined pattern throughout the defined scanning region. These systems also include a detection system for detecting light having at least a predetermined intensity reflected from the bar code symbols and for providing an electrical signal in response to detection of the reflected light. An optical system is used for directing light from the scanned light beam and is reflected from the code symbol on a received object to the detection system. Scanning systems of this type are useful in reading bar code symbols such as the .PN2universal bar code (UPC) code symbols that are affixed to many objects such as packaged grocery items and the like. UPC code symbols consists of parallel bars having various widths and spacings. Electrical signals provided by the detection system in response to scanning the code symbol are provided to a data processing system which provides various functions in relation to the information represented by the electrical signal, such as registering and displaying the price of an item, varying the code symbol and adjusting inventory of records concerning such items.

SUMMARY OF THE INVENTION

An multi-directional laser scanner apparatus has a frame along with a plurality of lasers removably mounted in circular fashion to the frame for producing a plurality of light beams. A multi-faceted rotating mirror assembly is rotatably mounted to the frame and rotated by an electric motor and is aligned with a plurality of laser output beams. A plurality of fixed mirrors are attached in pairs to the frame and positioned for reflecting the light energy of the laser beam being reflected by the rotating mirror assembly in a pattern onto a coded surface and positioned for receiving reflected beams from the coded surface and thendirecting the reflected beams in a reverse path onto the rotating mirror assembly and back towards each laser. A mirror mounted adjacent the output of each laser reflects each returning laser beam onto a photocell mounted to the frame for receiving the reflected signals from the coded surface and the signals are processed to read the coded signals. An alternate embodiment replaces two of the fixed array mirrors with a galvanometer and mirror assembly which oscillates a mirror affixed to each galvanometer to produce a second set of output scan lines over the primary laser output scan lines onto a bar code to reduce the chance that a small bar code will not be read by the primary scanner.

BRIEF DESCRIPTION OF THE DRAWINGS

Other objects, features, and advantages of the present invention will be apparent from the written description and the drawings in which:

FIG. 1 is an optical schematic of a single laser and mirror assembly in accordance with the present invention;

FIG. 2 is an optical schematic of an alternate embodiment of the laser scanner portion of FIG. 1;

DESCRIPTION OF THE PREFERRED EMBODIMENTS

Figure 3:
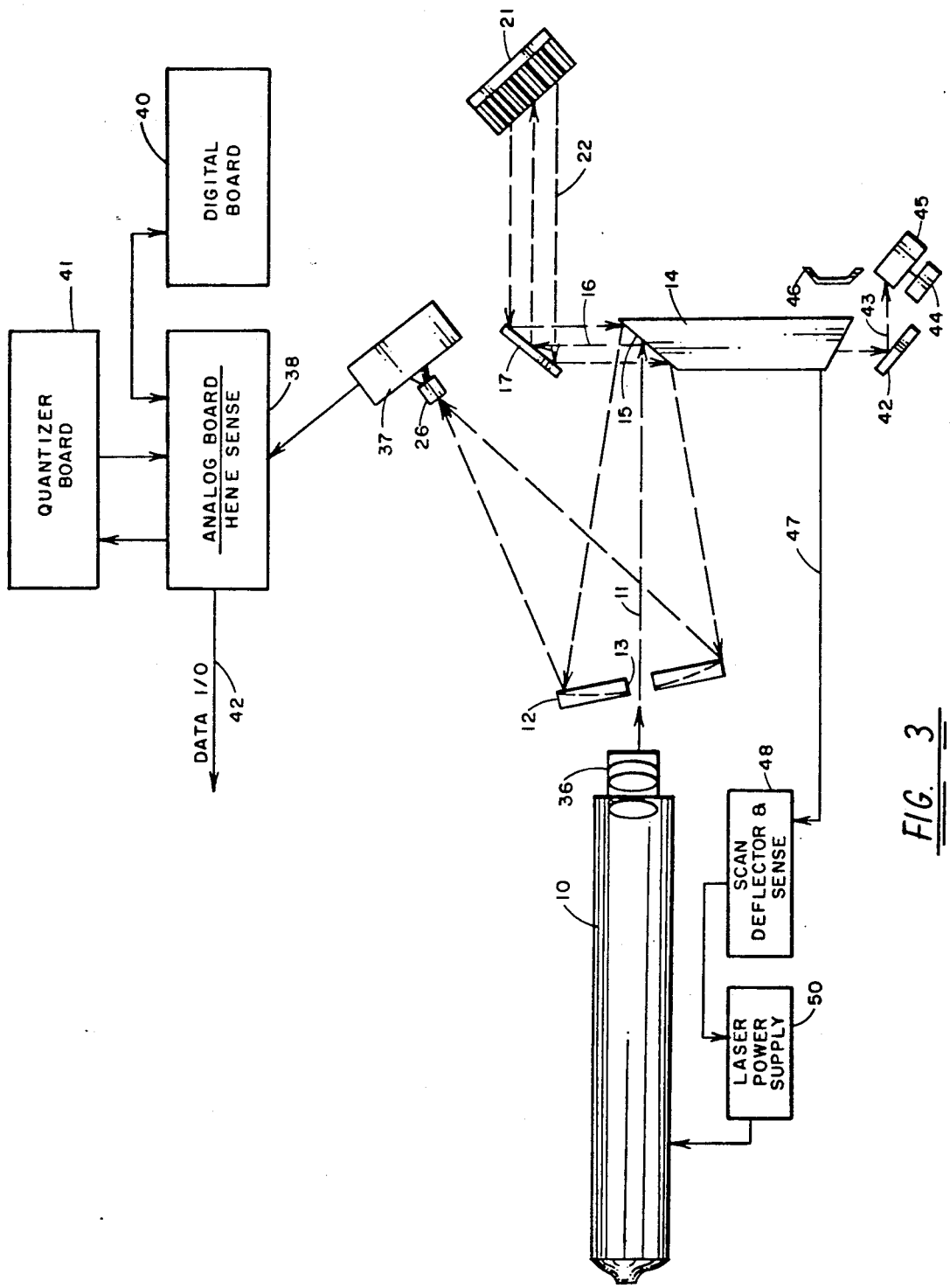
FIG. 3 is a schematic view of a laser scanner assembly in accordance with FIG. 2 having a block diagram of the signal processing electronics.

The present invention relates to an multi-directional bar code scanner which can be made up of a plurality of separate lasers and return signal sub-systems which use a common output and return signal light path. Eight or nine separate lasers can be utilized with a high speed rotating mirror to obtain very high speed read rates in a very compact multi-directional bar code scanner. Referring to the drawings and especially to FIG. 1, a portion of an multi-directional bar code scanner showing one separate laser and return signal sub-system is illustrated showing both the output and return signal light paths. A laser 10 may have a fixed alignment and is attached to a frame to generate a light beam 11 through a spherical return mirror 12 opening at 13 in the center of the mirror 12. The light path 11 impinges upon a high speed rotating faceted mirror assembly 14 where the beam 11 is reflected off the mirrored surfaces 15 and the reflected beam 16 is then reflected off a fixed array of mirrors 17. The fixed array mirrors 17 are mounted in pairs, each of said mirrors of a pair is at a slight angle to the other so that in combination with the rotating mirror assembly 14 a cross pattern is generated with each reflected beam 18 which impinges upon an object 20 having a bar code target 21 thereon. The bar code 21 has a series of laser beams impinging thereon from a plurality of lasers 10 of which only one is shown in FIG. 1 and each of the lasers 10 impinges upon the rotating mirror assembly 14 and a fixed array of mirrors 17 extending around the rotating mirrors 14 for alignment with each of the lasers 10. The signals impinging upon the object 20 are reflected in a reflected beam 22 in a retro-reflection beam to the fixed mirror 17 and from the fixed mirror 17 with the reflected beam 22 impinging upon the mirrored surfaces of the rotating mirror assembly 14. The beam 24 is reflected back towards the laser 10 where it is captured by the spherical mirror 12 and reflected through the beam 25 onto a photocell 26.

Figure 7:
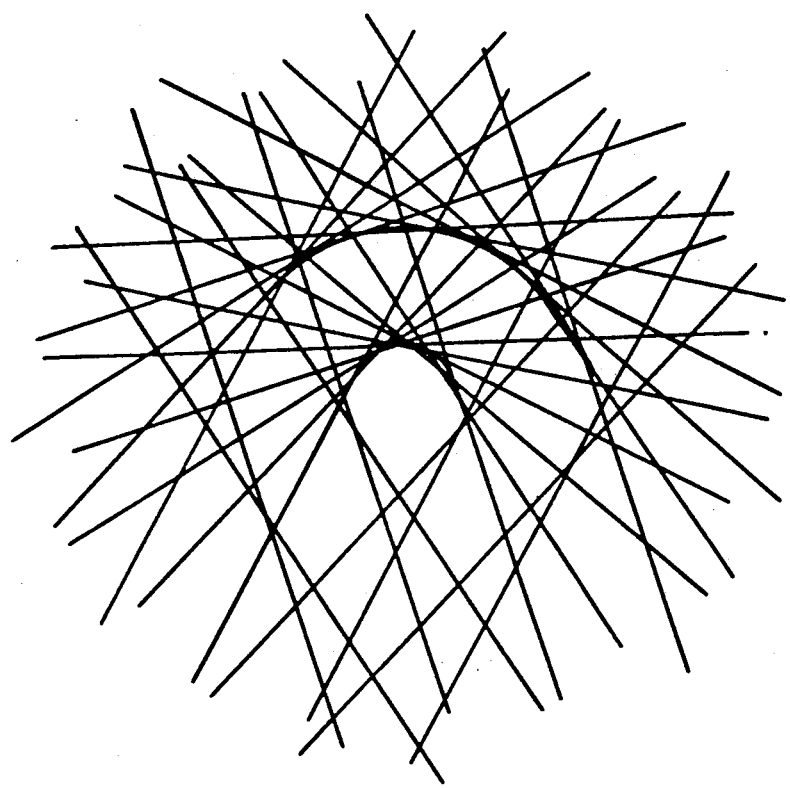
FIG. 7 shows the beam scanning lines of the primary scan pattern.

In operation, eight or nine of the lasers 10 would be spaced in a circular pattern around a fixed frame and would be rigidly held, each having a spherical return mirror 12 and each impinging upon the angled mirrors 15 of the high speed rotating mirrors 14 and each being directed against a separate pair of fixed mirrors 17 to each generate a cross pattern impinging upon the target 20 to thereby produce a pattern similar to that shown in FIG. 7 on the target 20 to read the bar code 21. Each laser beam is being returned to an individual photocell 26 and the accumulative signals are processed to read the bar code 21.

Figure 8:
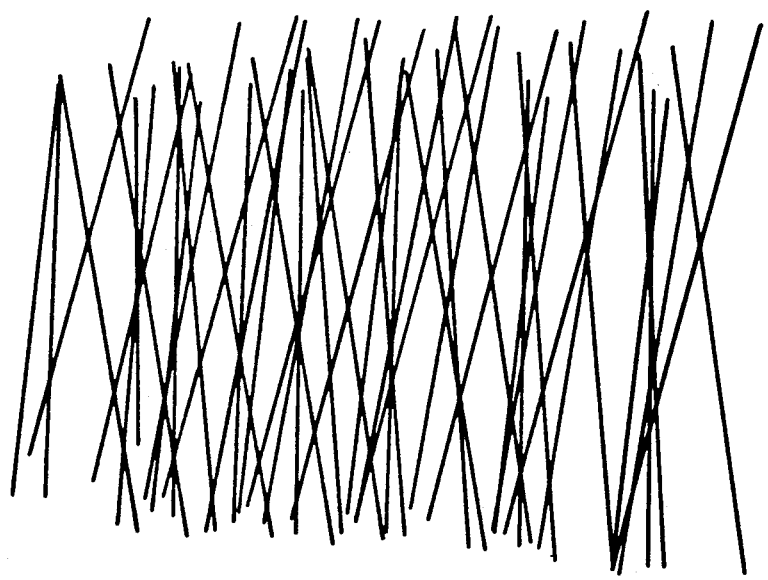
FIG. 8 shows the laser beam pattern of the secondary scan pattern.

FIG. 2 shows an alternative embodiment in which the laser 10 passes through the spherical optics 12 with a beam 11 through the opening 13 impinging upon the mirrored faceted surfaces 15 of the rotating mirror assembly 14 as in FIG. 1. In this case, the fixed mirror-pairs 17, which may have nine pairs of fixed mirrors operating with nine lasers 10 in FIG. 1, has the three and nine o'clock positions of the fixed mirrors 17 wrapping around the rotating mirror assembly 14 replaced by a galvanometer 30 having an oscillating mirror 31 attached thereto. Operation of the galvanometer operates the mirror 31 in the three and nine o'clock positions, one position being shown in FIG. 2, so that the lasers in those positions and the beam 11 is impinged upon the oscillating mirror 31 and thereby generates beams 32 which are rapidly changing cross beams which reflect from a fixed mirror 33 into a fixed mirror assembly 34 to produce a plurality of cross beams, as shown in FIG. 8, on a target 20. A secondary scan pattern, as shown in FIG. 8, is generated by the two positions of mirrors mounted to galvanometers which are oscillating and vibrating at a high speed such as a frequency of 100 cycles per second. The secondary scan pattern of FIG. 8 is thus superimposed on the primary scan pattern of FIG. 7 to have a second set of output scan lines over the primary laser output pair lines to provide a complex set of crossed pair lines to reduce the chance that a small bar code not be read.

Turning to FIG. 3, the laser 10 is shown to have an optics assembly 36 for the laser beam to pass through and passes through the spherical mirror 12 opening 13 where the laser beam 11. The beam is again impinged upon the high speed rotating mirror assembly 14 mirrored surfaces 15 where the reflected signal 16 impinges upon the pairs of angled mirrors and a fixed array of mirrors 17 and against a bar code 21. The reflected beams are fed back through the return beam 22 to the fixed mirror assembly, past the rotating mirrors 15 and impinge upon the spherical mirror 12 where they are reflected into the photocell 26. The photocell is connected to a preamplifier and signal conditioning assembly 37 which in turn is upwardly connected to an analog board 38 which in turn is connected to a digital board 40. Analog board 38 is interconnected with a quantitizer board 41 and produces a data input/output signal 42. This figure has one of the galvanometer circuits having the beam impinge upon a fixed mirror 42 of the fixed mirror assembly 17 where the beam 43 is reflected onto a galvanometer 44 mirror 45 which may be oscillating at 100 Hz to produce a cross signal into the fixed mirror 46 to generate a pattern on the target 21. In addition, a return mirror may be mounted to produce a return portion of a beam 47 to a scan deflector 48 which generates a signal to the laser power supply 50 which in turn is connected to the laser 10.

Figure 4:
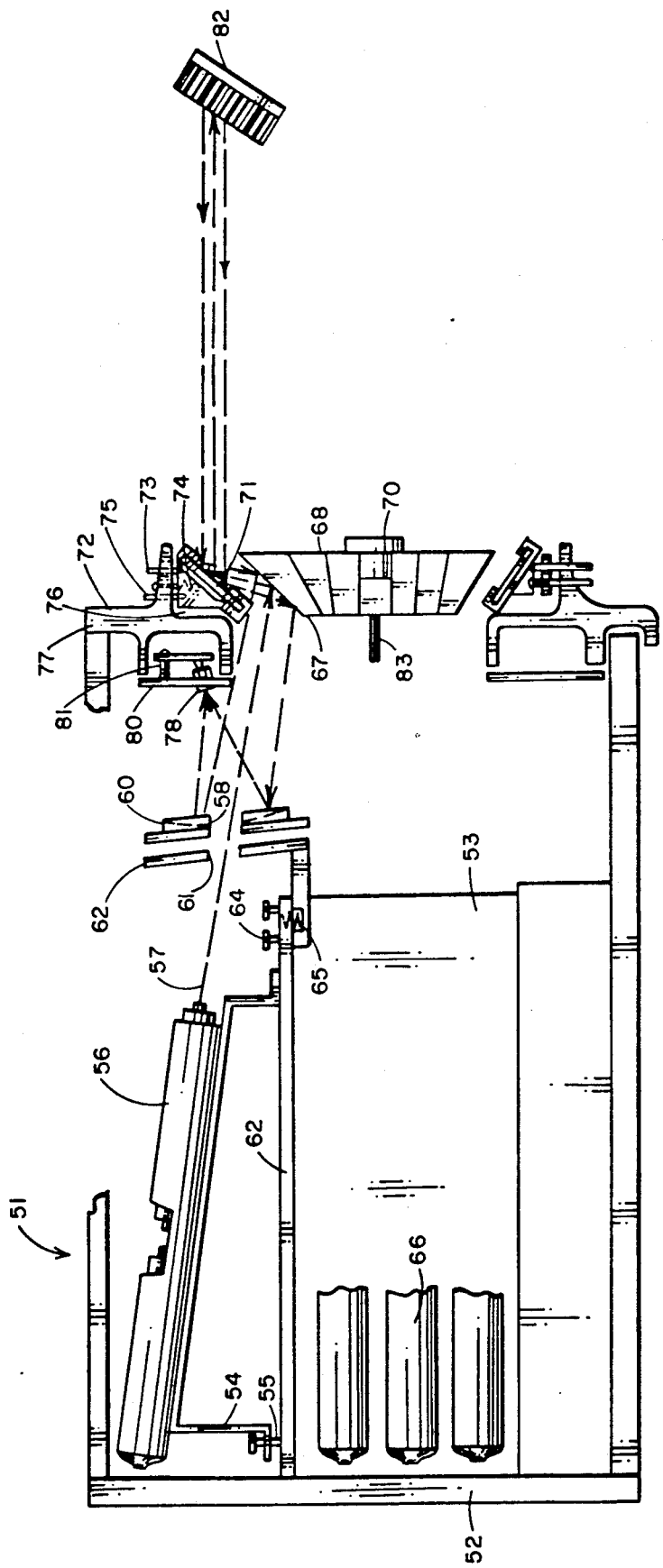
FIG. 4 is a cutaway sectional view of a laser scanner in accordance with the present invention.

Turning now to FIG. 4, an multi-directional bar code scanner 51 is shown having a frame 52 including a generally round or octagonal frame portion 53 and having a plurality of laser mounts 54 attached thereto with bolts 55. Each laser mount has an angled surface 55 already precisely aligned for a fixed alignment laser 56 to be mounted thereto in proper alignment to pass the laser beam 57 through the opening 58 of the spherical mirror 60 and through openings 61 in optics 62. The lasers 56 are advantageously small continuous wave (CW) lasers with fixed alignments which can be replaced by merely removing one laser 56 and mounting another one onto the mount surface 55 attached to the frame portion 53. The laser mount 54 is mounted to a surface 63 with bolts 64 on a spring 65 which allows for adjustment of the angle of the surface 62 attaching it to the circular frame portion 53 having a plurality of additional lasers 66 mounted therearound exactly the same as laser 56 is mounted to assembly 54. The laser beam 57 is impinged upon the faceted mirrors 67 of a rapidly rotating mirror assembly 68 which rotates on a hub 70 and is motor driven in any desired speed such as 1800, 2400, 3600, or 4800 rpm. The fixed mirror assemblies 71 mounts mirrors in pairs, each at a slight angle to the other mirror of the pair, such as one degree, so as to produce a cross pattern with the light being reflected from the rotating mirrors 67 from each laser 56. The fixed mirror 71 is held in a mirror support assembly 72 having a support for each of the fixed mirrors which includes an adjustment means having a bolt 73 along with a spring 74 and a bolt 75 attaching a mirror mounting bracket 76 to the fixed mirror frame 77. Thus by adjusting the bolts 74 and 75, the angle of the mirrors 71, which are mounted in pairs, can be adjusted as desired. The fixed mirror support frame 77 also supports the photocell 78 with a support bracket 80 having an adjustable bolt 81 to align the photocell for receiving the return beam from the spherical mirror 60 returning it from the target 82. The shaft 83 is connected to the hub 70 of the mirror assembly 68 and may support an electric motor to the frame 52 within the circular frame portion 53 which maintains the motor for rotating the mirror assembly 68 out of the way of any light path of the plurality of lasers 56 and 66.

Figure 5:
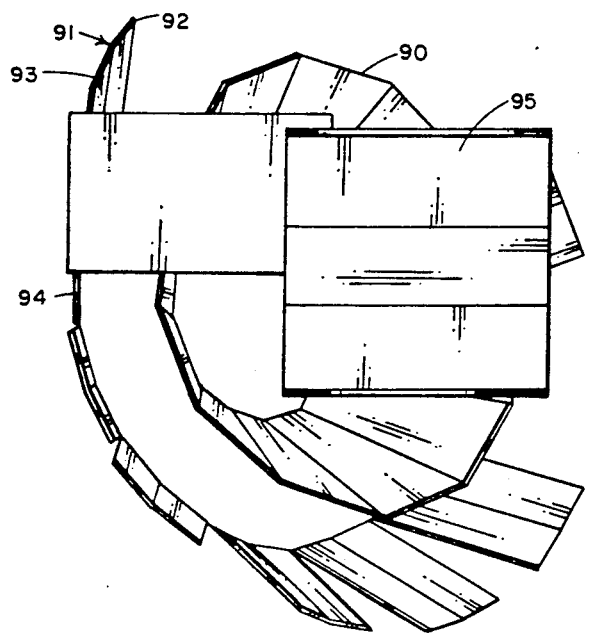
FIG. 5 is a perspective view of the rotating and fixed mirror assembly.

FIG. 5 shows a perspective view of a rotating and fixed mirror assembly in which a plurality of mirrors 90 are part of a high speed rotating mirror assembly which can operate in connection with an eight laser array each laser directing its beam against the angled faceted mirror surfaces 90. A plurality of fixed mirrors 91 in a fixed mirror array has each fixed mirror being two mirrors 92 and 93 mounted at a slight angle to each other and such that the rotating mirror directs any particularly laser beam across the pair of fixed mirrors to produce a cross pattern onto a target. Thus, there is one pair of fixed mirrors 91 for each faceted mirror surface 90 on the rotating mirror assembly. In addition, a galvanometer mounted mirror 94 can direct a beam to a three mirror assembly 95 for producing a secondary scan pattern.

Figure 6:
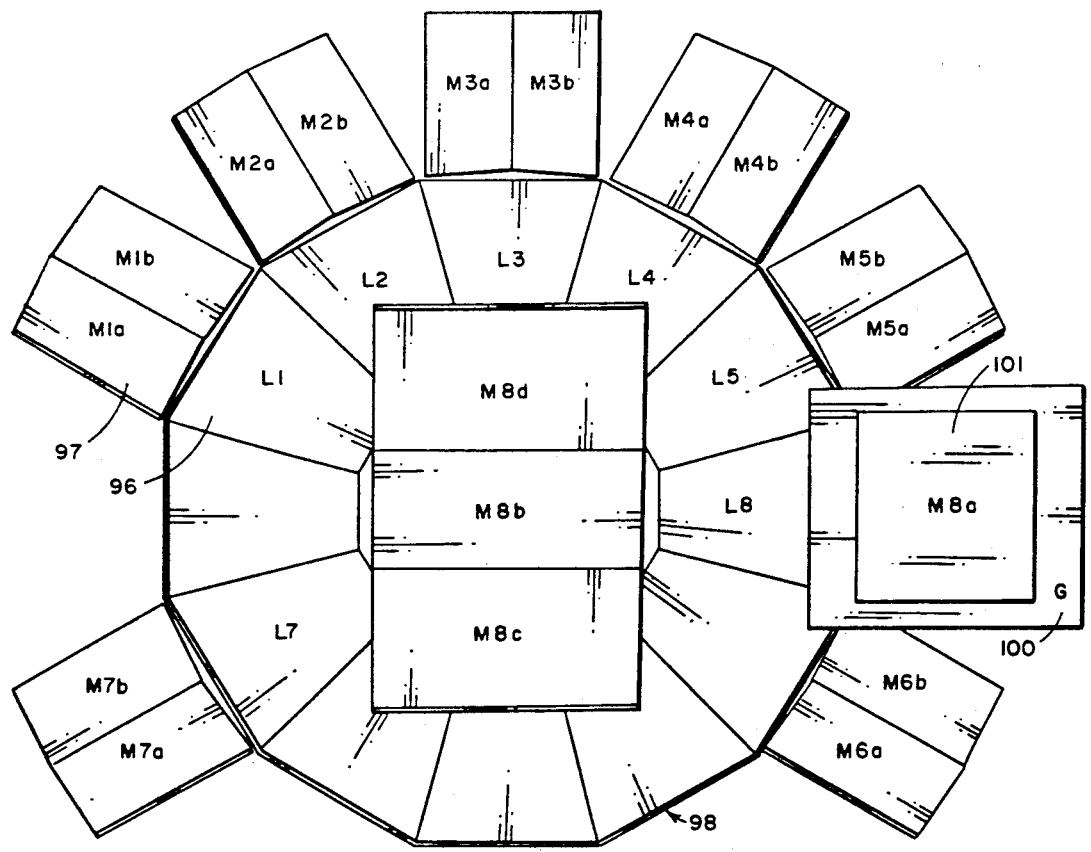
FIG. 6 is a front plan view of the mirror assembly of FIG. 5.

As seen in FIG. 6, a layout of the mirrors for a configuration using eight separate laser systems is shown in which of the seven lasers direct their beams on mirror 96. The beams are numbered L1 through L7, and are used in connection with the rotating mirror assembly and associated with fixed mirror assemblies 97 fixedly mounted therearound in numbered pairs M1 through M7, each mirror of the pair if numbered a & b. Thus, each laser beam marked L1 through L7 is impinging on the rotating mirrors 96 as being reflected onto the pair of fixed mirrors 97 with laser beam L1 always impinging upon mirrors M1a and M1b from the twelve faceted polygon 98 which may be rotating at 3600 rpm with each facet of the polygon placed at 1.12 degrees difference from the adjoining facet. The odd number of facets can be 45 degrees and the even number facets 46.12 degrees in order to adequately cover all possible orientations of a bar code label. The scan pattern combines the primary scan pattern with a secondary scan pattern. The secondary scan pattern can be generated by laser L8 which directs its beam onto the rotating polygon 98 which is reflected onto a galvanometer 100 mirror 101 which directs the beam from laser L8 onto the mirrors 102 which is three connected mirrors M8 (a, b & c). The galvanometer 100 can oscillate at different frequencies such as 40 Hz to shift three line X pattern across a bar code with dimension to provide the crossed X pattern as shown in FIG. 8. In FIG. 6, the 1.12 degree difference in the polygon surfaces of the rotating mirror assembly 98 shifts the scan lines to cover a wider target width without using more mirrors and laser subsystems and the resulting shifting of the scan lines serve to greatly reduce the probability of the scan spots from becoming too close together momentarily and causing the receivers to see returns from other than their corresponding lasers. Also, the scan shift changes the angle of instance of the laser on the second cut to greatly reduce the chance of no read resulting from specular reflections.

It should be clear at this point that an multi-directional bar code scanner has been provided which uses a plurality of lasers in separate laser subassemblies having a common output and return signal path for each laser system but using a single high speed rotating mirror assembly with a plurality of fixed mirror pairs. In operation, the system can resolve a 10 mil bar code with aspect ratios in the 0.35 range and the omni direction aspect of the system is such that a 10 mil bar code moving at 400 feet per minute and up to 16" away can be resolved without difficulty since the depth of field of the system is 15". The rotating mirror assembly is the only moving part and can be a 12 faceted rotating polygon rotating at 1800, 2400, 3600, or 4800 rpm. Accordingly, the present invention is not to be considered as limited to the forms shown which are to be considered illustrative rather than restrictive.

We claim:

1. A laser scanner comprising:
a frame;
a plurality of lasers removably mounted to said frame for producing a plurality of light beams;
a multi-faceted rotating mirror assembly rotatably mounted to said frame and being aligned with said plurality of laser output beams;
a plurality of fixed mirrors attached to said frame and positioned for reflecting light energy of said laser beams in a pattern onto a code surface and positioned for receiving reflected beams from said code surface and directing said beams in a beam path therefrom;
a plurality of photocells mounted to said frame for receiving reflected signals from a coded surface and from said plurality of fixed mirrors; and
an oscillating mirror attached to said frame and positioned for reflecting light energy of one of said plurality of lasers for creating a second scan pattern over said scan pattern generated by said plurality of lasers reflecting off said plurality of fixed mirrors, whereby a multi-directional scanner can rapidly scan bar codes through predetermined patterns.

2. A laser scanner in accordance with claim 1 in which each of said plurality of fixed mirrors are mounted in pairs, and each pair of fixed mirrors is positioned to reflect the beam from one laser.

3. A laser scanner in accordance with claim 2 in which each pair of said plurality of fixed mirrors, has one mirror of said pair mounted at an angle to the other of said pair of mirrors.

4. A laser scanner in accordance with claim 3 in which each pair of said plurality of fixed mirrors, has one mirror of said pair mounted at an angle of approximately one degree to the other of said pair of mirrors.

5. A laser scanner in accordance with claim 3 in which said multi-faceted rotating mirror assembly is a faceted rotating polygon having a plurality of mirrors on each facet thereof and each facet is positioned at a different angle from each adjoining facit to thereby double each beam reflected therefrom.

6. A laser scanner in accordance with claim 5 in which a spherical mirror is mounted adjacent each of said plurality of lasers and each said spherical mirror has an aperture therethrough and each said spherical mirror is mounted to align said laser beam with said spherical mirror aperture.

7. A laser scanner in accordance with claim 6 in which each said spherical mirror is aligned to reflect one returning beam onto one of said photocells.

8. A laser scanner in accordance with claim 1 including a plurality of fixed mirrors aligned with said oscillating mirror for directed a predetermined pattern on a target.

9. A laser scanner in accordance with claim 8 in which a pair of oscillating mirrors are mounted in place of two fixed mirrors.

10. A laser scanner in accordance with claim 1 in which said frame has a generally circular frame portion having said plurality of mirrors mounted therearound.

11. A laser scanner in accordance with claim 10 in which said generally circular frame portion has a plurality of laser mounting brackets thereon and each mounting bracket has an angled laser support surface thereon.

12. A laser scanner in accordance with claim 11 in which each said mounting bracket has an adjustment means for adjusting the bracket to adjust a laser mounted thereon.

13. A laser scanner in accordance with claim 4 in which each of said plurality of fixed mirrors has adjustment means for adjusting each of said fixed mirror pairs of mirrors relative to each other of the mirror pair.

14. A laser scanner in accordance with claim 1 in which each said laser beam is doubled into two element beams approximately 15 degrees to each other by said plurality of fixed mirrors.

15. A laser scanner in accordance with claim 14 in which each said two element beams are again doubled to form four element beams by the facets of said multi-faceted rotating mirror assembly, whereby each of a plurality of lasers produces two cross beam patterns.

* * * * *